(12) United States Patent
Huseman

(10) Patent No.: US 7,206,687 B1
(45) Date of Patent: Apr. 17, 2007

(54) METHOD FOR CONTROLLING A HYBRID ELECTRIC VEHICLE

(75) Inventor: Steven C. Huseman, Noblesville, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/399,236

(22) Filed: Apr. 6, 2006

(51) Int. Cl.
*G06F 19/00* (2006.01)
*F02D 35/00* (2006.01)

(52) U.S. Cl. .................. 701/102; 701/22; 701/115; 180/65.2

(58) Field of Classification Search ............. 701/102, 701/101, 115, 114, 22; 180/65.2, 65.4; 73/117.3; 290/40 A, 40 C, 51
See application file for complete search history.

(56) References Cited

U.S. PATENT DOCUMENTS 6,876,098 B1 * 4/2005 Gray, Jr. .................. 290/40 D
6,976,388 B2   12/2005 Heap et al. ............... 73/118.1
6,998,727 B2 *  2/2006 Gray, Jr. .................. 290/40 C \* cited by examiner

*Primary Examiner*—Hieu T. Vo
(74) *Attorney, Agent, or Firm*—Christopher DeVries

(57) ABSTRACT

The present invention provides a method adapted to control a hybrid electric vehicle having a primary power source and a secondary power source. The method includes estimating the power capability of the primary power source, and thereafter obtaining a power command from the vehicle's driver. A primary power demand and a secondary power demand which collectively meet the driver power command are then established, and a desired power balance between the primary power demand and the secondary power demand is also obtained. A system power capability is calculated based on the desired power balance and the estimated power capability. The method of the present invention then determines if the driver power command exceeds the system power capability. If the driver power command exceeds the system power capability, the driver power command limited and thereafter the limited driver power command is executed.

11 Claims, 2 Drawing Sheets

METHOD FOR CONTROLLING A HYBRID ELECTRIC VEHICLE

TECHNICAL FIELD

The present invention pertains generally to a method for controlling a hybrid electric vehicle to optimize performance and prevent overuse of an energy storage system.

BACKGROUND OF THE INVENTION

Hybrid electric vehicles typically include an engine and an electric motor/generator which are operable to drive the vehicle. When a person driving the vehicle depresses the gas pedal, a control module establishes a driver power command and thereafter controls the engine and/or the electric motor/generator to meet such command. It is well known to balance engine usage and electric motor/generator usage to meet the driver power command in a fuel efficient manner.

SUMMARY OF THE INVENTION

The method of the present invention is configured to control a hybrid electric vehicle having a primary power source and a secondary power source. The method includes estimating the power capability of the primary power source, and thereafter obtaining a power command from the vehicle's driver. A primary power demand and a secondary power demand which collectively meet the driver power command are then established, and a desired power balance between the primary power demand and the secondary power demand is also obtained. A system power capability is calculated based on the desired power balance and the estimated power capability.

The method of the present invention then determines if the driver power command exceeds the system power capability. If the driver power command exceeds the system power capability, the driver power command limited and thereafter the limited driver power command is executed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
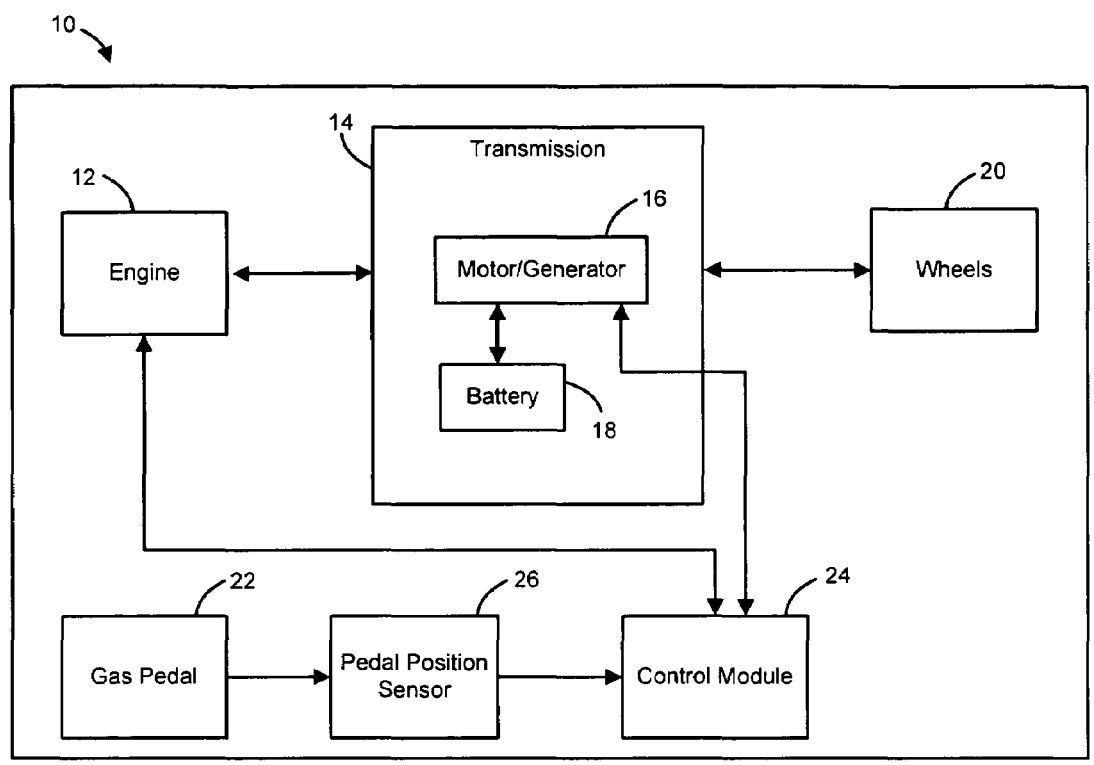
FIG. 1 is a schematic illustration of a vehicle in accordance with the present invention.

In a conventional hybrid vehicle system, a control module controls an engine and/or an electric motor/generator in order to produce enough power to meet a given driver power command. The engine usage and the electric motor/generator usage are generally balanced to meet the driver power command in an optimally fuel efficient manner. As an example, if the driver power command is 100 kilowatts (kW), the controller may determine that the engine should produce 75 kW and the electric motor/generator should produce 25 kW of power such that a total of 100 kW of power is produced and the driver power command is met. In other words, the control module establishes an engine power demand (75 kW) and a motor/generator power demand (25 kW) which, when added together, equal the driver power command (100 kW).

If the engine in a conventional hybrid vehicle is not optimally performing or is not fully capable, it may be incapable of meeting a given engine power command. Less than optimal engine performance may be attributable to, for example, a clogged fuel line or fuel filter, a boost leak in a turbocharged engine, or an engine overheating condition. In order to meet the driver power command when the engine is not fully capable, a conventional hybrid vehicle will increase the motor/generator power demand by an amount necessary to compensate for the under performing engine. Referring to the preceding example wherein the driver power command is 100 kW, if the engine is only capable of producing 65 kW of power the motor/generator would produce 35 kW of power in order to compensate for the engine and thereby meet the driver torque command.

Implementation of the electric motor/generator to compensate for an improperly performing engine can result in over use of the energy storage system powering the electric motor/generator. This over use of the energy storage system can produce additional heat which may reduce component life and durability. Additionally, implementation of the electric motor/generator to compensate for an improperly performing engine masks the underlying engine problem. As the drivers demands are being met, overall vehicle performance is not diminished and the driver does not receive any indication that the engine is not fully capable. Therefore, the engine is less likely to receive the service it requires.

Conventional diagnostic methods for determining errors in the system such as from the primary power source dealt with large errors in estimated power input into the transmission from the primary power source and did not adjust output capability for small percentage errors and account for long term effects of these small errors. Those methods also did not address cases where the primary power source would not meet the commanded power even though it reported correctly the power it was making.

Referring to the drawings, wherein like reference numbers refer to like components, FIG. 1 shows a schematic illustration of a vehicle 10 in accordance with the present invention. The vehicle 10 includes a primary power source such as the engine 12 which is operatively connected to a transmission 14. The transmission 14 includes a secondary power source such as the motor/generator 16 which is operatively connected to an energy storage system such as the battery 18. The motor/generator 16 may draw energy from the battery 18 in order to power the vehicle 10, or may generate and transmit energy to the battery 18 for storage. The transmission 14 is connected to the wheels 20 of the vehicle 10. A gas pedal 22 is operatively connected to a control module 24 which controls the output of the engine 12 and the motor/generator 16 to power the vehicle 10. According to the preferred embodiment, the vehicle 10 is a commercial bus and the engine 12 is a diesel engine, however the present invention is also applicable to other vehicle types and engine configurations.

Figure 2:
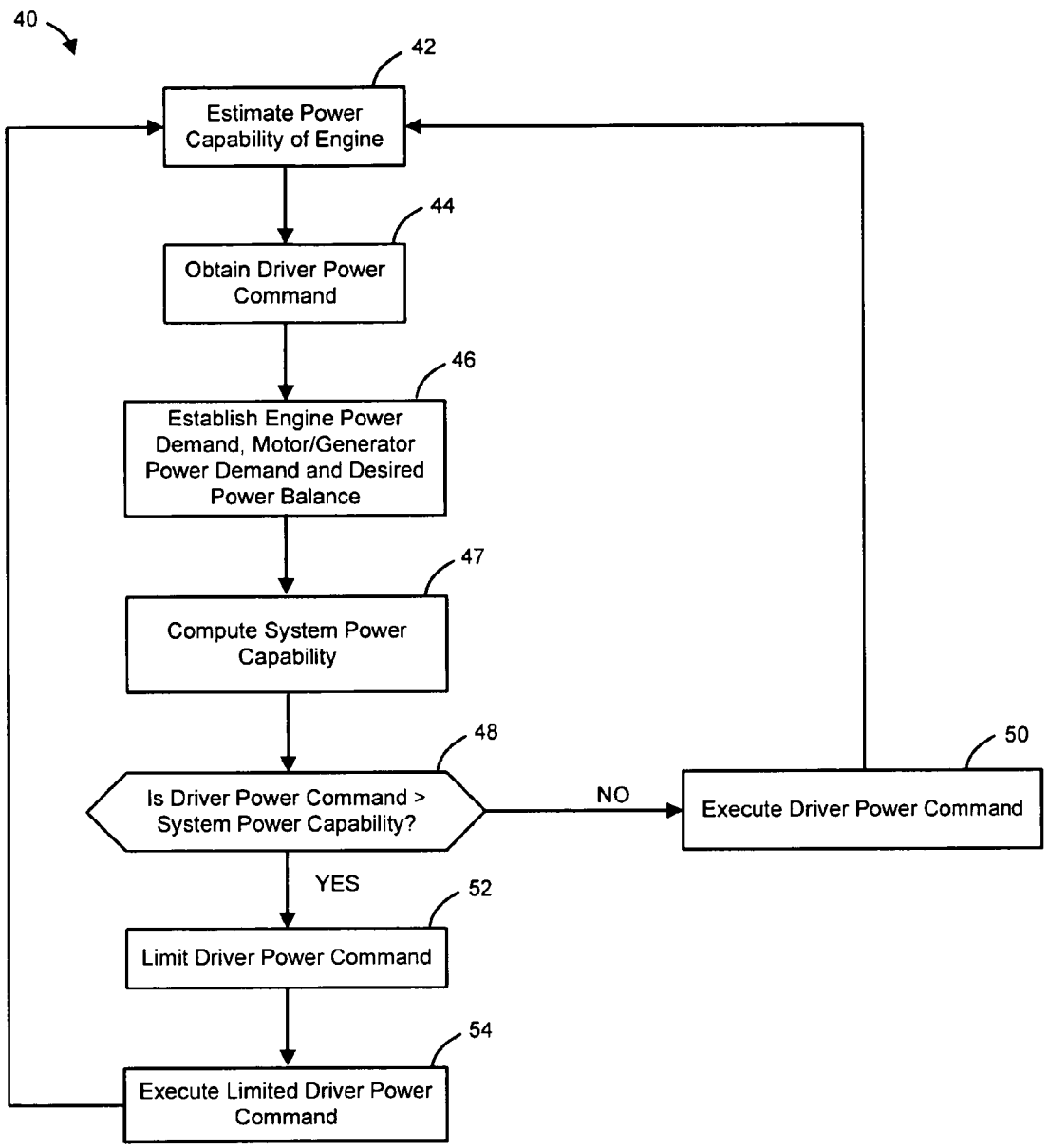
FIG. 2 is a flow chart illustrating a method in accordance with the present invention.

Referring to FIG. 2, a method 40 (also referred to herein as algorithm 40) in accordance with the present invention is shown. More precisely, FIG. 2 shows a block diagram representing steps performed by a control device such as the control module 24 (shown in FIG. 1).

At step 42, the algorithm 40 estimates the power capability of a primary power source such as the engine 12 (shown in FIG. 1) of the vehicle 10 (shown in FIG. 1). This step is preferably performed in accordance with the method disclosed in commonly assigned patent application entitled "METHOD FOR ESTIMATING THE POWER CAPABILITY OF THE PRIMARY POWER SOURCE OF A HYBRID VEHICLE", issued to Huseman et al., Ser. No. 11/399,235, Filed Apr. 6, 2006, and which is hereby incorporated by reference in its entirety. As described in Huseman et al., the method for estimating the power capability of the primary power source of a hybrid vehicle includes implementing an algorithm configured to calculate three indicators $I_1$, $I_2$, and $I_3$ which each provide an indication or estimate of the power capability of an engine. Thereafter, the algorithm combines the indicators $I_1$, $I_2$, and $I_3$ to generate a composite indicator $I_C$.

The first indicator $I_1$ is obtained from engine broadcast data if such data is available. Engines which broadcast torque capability estimates include, for example, those using SAE J1939 data communication protocol. The second indicator $I_2$ is based on an engine power request error. The second indicator $I_2$ is calculated by subtracting a delivered torque value Td from a requested torque value Tr, and converting the resultant torque error to a power error. The third indicator $I_3$ is based on a plurality of system dynamic equations.

The system dynamic equations for the third indicator $I_3$, and a method of implementing such equations to obtain an estimate for engine torque error are described in commonly assigned U.S. Pat. No. 6,976,388, entitled "DIAGNOSTIC METHOD FOR A TORQUE CONTROL OF AN ELECTRICALLY VARIABLE TRANSMISSION", issued to Heap et al., and which is hereby incorporated by reference in its entirety. As described in Heap et al., the system dynamic equations are determined using Newton's second law applicable to rotating bodies (i.e., net external torque=rotational inertia*angular acceleration). A series of free body diagrams representing components of a particular vehicle transmission are then produced. Newton's second law is applied to each component of the transmission which is represented by a free body diagram in order to obtain a summation of all the external torques acting on a given transmission component. All the free body diagrams are combined to produce one or more system matrix equations. These system matrix equations represent the characteristic open loop response of a particular vehicle system.

To obtain an estimation of the engine torque error, a closed loop control portion of the equation is added to the system matrix equations. The closed loop control portion is based on a feedback response adapted to correct for an engine speed error. The engine speed error is defined as the difference between a desired engine speed and an actual engine speed. As the magnitude of the feedback response is proportional to the engine speed error, the magnitude of the feedback response may be used to estimate the engine torque error.

After calculating the three indicators $I_1$, $I_2$, and $I_3$, they are each preferably filtered and normalized. For purposes of the present invention, the term "filter" refers to the process of averaging a plurality of data points taken over a predetermined time period, and the term "normalize" refers to the process of standardizing a given indicator value to a maximum system power capability such that the normalized value is in the form of a percentage of maximum capability. The composite indicator Ic representing the power capability estimation of the primary power source (e.g., engine) is then obtained by according to the equation $I_C$=normalized $I_1$*normalized $I_2$*normalized $I_3$.

At step 44, the algorithm 40 obtains a driver power command. The driver power command is preferably obtained in the following manner. A pedal position sensor 26 (shown in FIG. 1) operatively connected to the gas pedal 22 transmits a signal indicative of the gas pedal position (i.e., the amount by which the pedal 22 is depressed) to the control module 24 (shown in FIG. 1). The gas pedal position is input into a throttle lookup table stored in the control module 24 in order to obtain the driver power command. The throttle lookup table is preferably compiled through testing. As an example, if the pedal position sensor 26 indicates that the gas pedal 22 is 75% depressed, and previous testing indicates that a vehicle similar to the vehicle 10 produces 100 kW of power at 75% throttle, then the current driver power command is 100 kW.

At step 46, the algorithm 40 initially establishes an engine power demand and a motor/generator power demand. The engine power demand and the motor/generator power demand are generally selected to collectively meet the driver power command in an optimally fuel efficient manner. In other words, engine output and motor/generator output are balanced such that they combine to meet the driver power command while consuming the least amount of fuel. The desired power balance ratio may also be calculated at step 46 as: (motor/generator power demand) divided by (engine power demand). Balancing the usage of multiple power sources in a hybrid vehicle in order to optimize fuel economy is well known to those skilled in the art and therefore will not be described further.

At step 47, the algorithm 40 calculates a system power capability. The system power capability is preferably based on the desired power balance between the engine power demand and the motor/generator power demand (established at step 46), and the estimated power capability of the engine 12 (established at step 42). As an example, assume that the estimated power capability of the engine 12 obtained at step 42 is 70 kW, and the driver power command obtained at step 44 is 100 kW. Further assume that the engine power demand and motor/generator power demand obtained at step 46 are respectively 80 kW and 20 kW. The desired power balance defined as motor/generator power demand vs. engine power demand is therefore equal to 20/80 or 1/4. Applying the desired power balance ratio (1/4) to the estimated power capability of the engine 12 (70 kW) provides a reduced motor/generator output value of 70/4=17.5. Therefore, according to the present example, the system power capability is 70+17.5=87.5 kW. In other words, even though the driver is requesting 100 kW of system power at step 44, is has been estimated the system is only capable of providing 87.5 kW while maintaining the desired power balance ratio of 1/4.

At step 48, the algorithm 40 determines if the driver power command (established at step 44) is greater than the system power capability (established at step 47). If the driver power command is not greater than the system power capability, the algorithm 40 proceeds to step 50. If the driver power command is greater than the system power capability, the algorithm 40 proceeds to step 52.

At step 50, because the vehicle system is capable of meeting the driver power command (established at step 44), the algorithm 40 executes the driver power command. More precisely, the algorithm 40 controls the engine 12 (shown in FIG. 1) to meet the engine power demand (established at step 46) and the algorithm 40 controls the motor/generator 16 (shown in FIG. 1) to meet the motor/generator power demand (established at step 46) such that the driver power command 44 (established at step 44) is met while maintaining the desired power balance ratio (established at step 46). After completing step 50, the algorithm 40 returns to step 42.

At step 52, because the vehicle system is not capable of meeting the driver power command (established at step 44), the algorithm 40 limits or reduces the driver power command and proportionally reduces the engine power demand to match the amount of power the engine is capable of producing (i.e., the engine power capability established at step 42). In other words, the driver power command is limited or reduced to the system power capability such that the capability of the engine 12 (shown in FIG. 1) is not exceeded and the desired power balance ratio (established at step 46) is maintained.

At step 54, the algorithm 40 executes the limited driver power command (established at step 52). More precisely, the algorithm 40 controls the engine 12 (shown in FIG. 1) and the motor/generator 16 (shown in FIG. 1) to collectively meet the limited driver power command such that desired power balance ratio (established at step 46) is maintained. After completing step 54, the algorithm 40 returns to step 42.

If the engine 12 (shown in FIG. 1) is incapable of meeting a given engine power demand because the engine 12 is not fully capable, the engine power demand is limited as described hereinabove. The motor/generator power demand is not increased to compensate for engine performance issues as is the case in a conventional hybrid system, and the driver power command is therefore not fully met. As the driver power command is not being fully met (i.e., vehicle performance is diminished), the driver can recognize that the engine 12 is not fully capable and requires service. According to an alternate embodiment, information indicating that the engine 12 is not fully capable can be conveyed to the driver through an operator interface such as, for example, a warning light (not shown). Additionally, as the motor/generator 16 (shown in FIG. 1) is not being implemented to compensate for an engine which is not fully capable, there is a reduced risk of motor/generator overuse such that battery life and durability are improved.

While the best modes for carrying out the invention have been described in detail, those familiar with the art to which this invention relates will recognize various alternative designs and embodiments for practicing the invention within the scope of the appended claims.

The invention claimed is:

1. A method for controlling a hybrid electric vehicle having a primary power source and a secondary power source comprising:
   estimating the power capability of the primary power source;
   obtaining a driver power command;
   establishing a primary power demand for the primary power source, a secondary power demand for the secondary power source, and a desired power balance between the primary power demand and the secondary power demand;
   calculating a system power capability based on the desired power balance and the estimated power capability of the primary power source;
   determining if the driver power command exceeds the system power capability;
   limiting the driver power command if the driver power command exceeds the system power capability; and
   executing the limited driver power command.

2. The method of claim 1, wherein said obtaining a driver power command includes monitoring the position of a gas pedal, and implementing a throttle lookup table.

3. The method of claim 1, wherein said establishing a primary power demand and a secondary power demand includes establishing a primary power demand and secondary power demand which collectively meet the driver power command in an optimally fuel efficient manner.

4. The method of claim 1, further comprising executing the driver power command if the driver power command does not exceed the system power capability.

5. The method of claim 1, wherein the primary power source is an engine.

6. The method of claim 5, wherein the secondary power source is an electric motor/generator.

7. A method for controlling a hybrid electric vehicle having a primary power source and a secondary power source comprising:
   estimating the power capability of the primary power source;
   obtaining a driver power command;
   establishing a primary power demand for the primary power source and secondary power demand for the secondary power source which collectively meet the driver power command;
   establishing a desired power balance between the primary power demand and the secondary power demand;
   calculating a system power capability based on the desired power balance and the estimated power capability of the primary power source;
   determining if the driver power command exceeds the system power capability;
   executing the driver power command if the driver power command does not exceed the system power capability;
   limiting the driver power command if the driver power command exceeds the system power capability; and
   executing the limited driver power command if the driver power command exceeds the system power capability.

8. The method of claim 7, wherein said obtaining a driver power command includes monitoring the position of a gas pedal, and implementing a throttle lookup table.

9. The method of claim 7, wherein the primary power source is an engine.

10. The method of claim 9, wherein the secondary power source is an electric motor/generator.

11. A method for controlling a hybrid electric vehicle having an engine and an electric motor/generator comprising:
   estimating the power capability of the engine;
   monitoring the position of a gas pedal and implementing a throttle lookup table to obtain a driver power command;
   establishing an engine power demand for the engine and a motor/generator power demand for the motor/generator which collectively meet the driver power command;
   establishing a desired power balance between the engine power demand and the motor/generator power demand;
   calculating a system power capability based on the desired power balance and the estimated power capability of the engine;
   determining if the driver power command exceeds the system power capability;
   executing the driver power command if the driver power command does not exceed the system power capability;
   limiting the driver power command if the driver power command exceeds the system power capability; and
   executing the limited driver power command if the driver power command exceeds the system power capability.

* * * * *